United States Patent [19]

Vellinga

[11] Patent Number: 4,609,460

[45] Date of Patent: Sep. 2, 1986

[54] ANAEROBIC PURIFICATION EQUIPMENT FOR WASTE WATER

[75] Inventor: Sjoerd H. J. Vellinga, Wommels, Netherlands

[73] Assignee: Paques B.V., Balk, Netherlands

[21] Appl. No.: 757,936

[22] Filed: Jul. 23, 1985

[30] Foreign Application Priority Data

Jul. 24, 1984 [NL] Netherlands .................. 8402337

[51] Int. Cl.$^4$ .......................... C02F 11/04; C12P 5/02
[52] U.S. Cl. ..................................... 210/188; 210/218; 210/262; 210/603; 435/316; 435/167; 48/111
[58] Field of Search .............. 210/603, 218, 180, 188, 210/262; 435/167, 801, 316, 304; 48/197 A, 111

[56] References Cited

U.S. PATENT DOCUMENTS

| | | | |
|---|---|---|---|
| 3,812,029 | 5/1974 | Snyder, Jr. ............... | 208/113 |
| 4,253,956 | 3/1981 | Pette ........................ | 210/188 |
| 4,346,000 | 8/1982 | Van Drooge ............. | 210/218 |
| 4,412,003 | 10/1983 | Evans ....................... | 210/218 |

FOREIGN PATENT DOCUMENTS

| | | |
|---|---|---|
| 361015 | 2/1981 | Austria . |
| 0012476 | 3/1980 | European Pat. Off. . |
| 1584857 | 3/1970 | Fed. Rep. of Germany . |
| 3232530 | 3/1984 | Fed. Rep. of Germany . |
| 3323915 | 1/1985 | Fed. Rep. of Germany ...... 435/167 |
| 3326879 | 2/1985 | Fed. Rep. of Germany ...... 210/603 |

Primary Examiner—Benoit Castel
Attorney, Agent, or Firm—Dennison, Meserole, Pollack & Scheiner

[57] ABSTRACT

A considerable portion of the gas developed by fermentation in an anaerobic purification equipment for waste water, together with buoyant sludge, is collected by at least one additional collecting system (5), before it may reach the upper part of the reactor. This additional collecting system is fitted at a distance below the collecting system (6) fitted as usual just below the level of one or more overflow gutters (3; 23) for purified water. The additional collecting system (5) has a hydraulic link with one or more rising pipes (7, 7', 27, 32, 31) for raising the liquid sludge mixture by gas lift action. The rising pipes discharge into a separation device (8) from which one or more downpipes (9; 29) for returning separated liquid and sludge extend to the lower section of the reactor chamber. As a result of the tranquility at the top and the turbulence near the bottom, a substantial increase of the load capacity of the equipment can be obtained.

10 Claims, 5 Drawing Figures

ANAEROBIC PURIFICATION EQUIPMENT FOR WASTE WATER

BACKGROUND OF THE INVENTION

The invention relates to an anaerobic purification equipment for waste water comprising a container with a reactor chamber for fermentation, means for introducing influent into the reactor chamber, at least one overflow gutter for collecting purified water by overflow, and, fitted below the level of the overflow gutter, a collecting system for collecting and removing gas from the liquid.

First subjecting waste water which contains organic material to a process in which the organic material is broken down into substances soluble in water, in particular fatty acids and then treating the water pretreated in this manner under anaerobic conditions by contact with granular sludge which contains methane-producing microorganisms, methane being produced which is separated from the liquid which still contains sludge, is known. The treated water (effluent) is removed via overflows. For the anaerobic fermentation the theoretical residence time of the liquid in the reactor is determined by the hydraulic flow in conjunction with the total capacity of the equipment including the settling chamber. The optimum residence time of the liquid in the reactor is determined, provided there is sufficient sludge present, among others by the COD concentration of waste water. It has been found that with a residence time of several hours a purification of as much as 90% can be reached. The extent to which such a purification efficiency can be maintained over a long period also depends on the sludge retention. In particular, care must be taken to ensure that on average no more sludge is rinsed out of the reactor than can be formed in a certain period of time. If a high hydraulic flow is used with a low COD concentration in the influent, there is a considerable risk that the internal settler will not be capable of preventing a large amount of sludge being flushed out. A factor which is of importance in this connection is the hydraulic surface loading of the settler.

Because there is a difference in density between the settled sludge mass in the settling chamber and the mixture of sludge particles, waste water and small gas bubbles in a reactor, the settled mass is partially stirred up. As a result of the turbulence produced by this in the uppermost part of the reactor an excessive quantity of sludge will be flushed out of the reactor. To this must be added the fact that so much methane has penetrated into a portion of the sludge grains that the grains have become lighter than the ambient liquid. This limits the load capacity of the reactor to a considerable extent.

From Dutch Patent Application 82.01293 it is known that the "gas-lifting recirculation" of the settled mass can be controlled by creating an overpressure in the gas-collecting chamber. According to this publication the overpressure required for this is at most 30% of the static pressure in the reactor. This measure therefore prevents a portion of the settled mass being removed with the overflow as a result of uncontrolled gas evolution. A disadvantage of this method is that as a result of the implementation of this type of method, installations are required which withstand pressure, and this entails a considerable increase in the cost price.

SUMMARY OF THE INVENTION

The invention aims to overcome the disadvantages described above and to create a reactor of the type mentioned in the introduction in which a good control of the gas-lifting effect can be achieved without overpressure being produced in the reactor.

According to the invention for this purpose at least one additional collecting system for collecting gas and buoyant sludge is fitted at a distance below the first-named collecting system, which additional system has a hydraulic link with at least one rising pipe for raising the liquid sludge mixture by gas lift action, said rising pipe discharging into a separation device for separating gas and liquid.

In view of the fact that gas and buoyant sludge are trapped at a considerable distance below the liquid level and are conveyed further via the said rising pipe or rising pipes, an essentially turbulence-free flow can occur in the uppermost section of the reactor. This increases the load capacity. At the top clean effluent is obtained.

It is of importance that the buoyant sludge which is carried along with the gas to the rising pipe or rising pipes is separated and returned to the reactor. While a quiet, eddy-free flow is required at the top of the reactor, good mixture of sludge and fluid will be required at the bottom of the reactor. For this purpose the heavy sludge has to be fluidised.

In a preferred embodiment according to the invention this fluidisation can be achieved in the bottom section of the reactor with the aid of the energy from the gas lifting in the rising pipe or rising pipes described provided that from said separation chamber at least one downpipe for returning separated liquid and sludge extends to the bottom section of the reactor chamber.

The gas will have to be freed from the extrained foam. For this purpose use can be made of a defoamer for separating gas and foam, which defoamer is connected to a separation device and has an outlet connection for separated liquid to the said downpipe.

It is preferable that the first-named collecting system is also connected to the said separation device.

The additional collecting system will have to collect the gas and the buoyant sludge as completely as possible and will have to carry it off to the rising pipe or rising pipes without the rising liquid being excessively accelerated by constriction of the cross-section. In particular, such an acceleration would per se cause disturbance in the uppermost section of the reactor. According to the invention this is catered for by the fact that at least the said additional collecting system has a number of hoods arranged in layers, the hoods in each layer having a certain offset in relation to the hoods of a subsequent layer and that the cross-sectional area occupied by the hoods in one layer is at most 55% of the total cross-sectional area.

Within a relatively large reactor container the various pipes can be accommodated in a space-saving manner if within the container there is a number of said rising pipes which alternate with pipes provided by said collecting systems for conveying the purified liquid to an overflow gutter and with at least one downpipe, the various pipes being hexagonal and adjoining each other in a honeycomb pattern.

The invention will now be explained in more detail by reference to the figures in which two exemplary embodiments are shown more or less diagrammatically.

DESCRIPTION OF THE PREFERRED EMBODIMENTS

Figure 1:
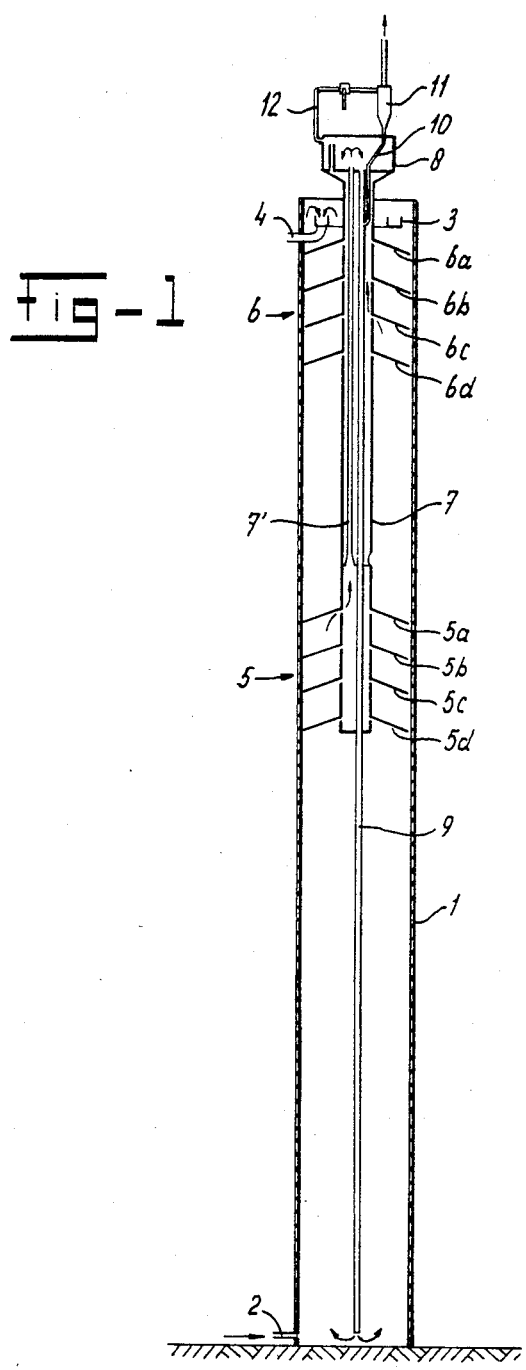
FIG. 1 shows a vertical section of the first embodiment.
Figure 2:
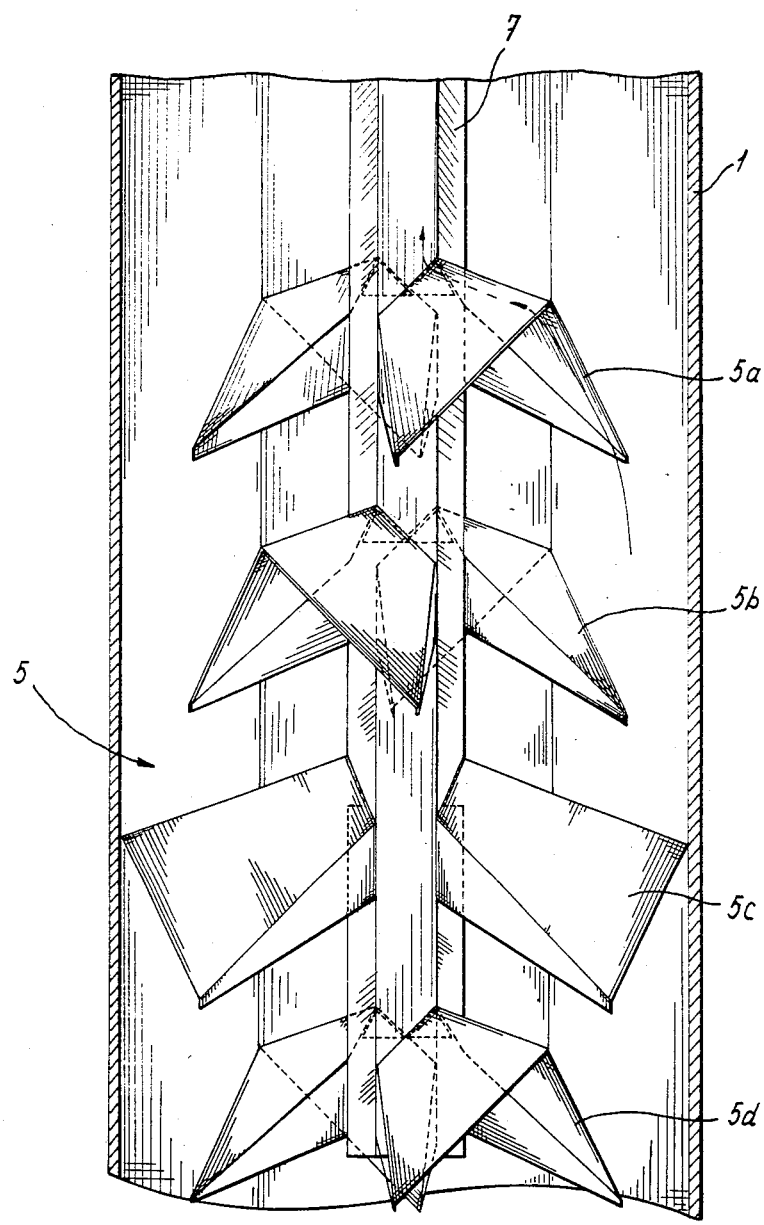
FIG. 2 shows on a larger scale a detail of the collecting system, of this embodiment, for collecting gas and buoyant sludge.
Figure 3:
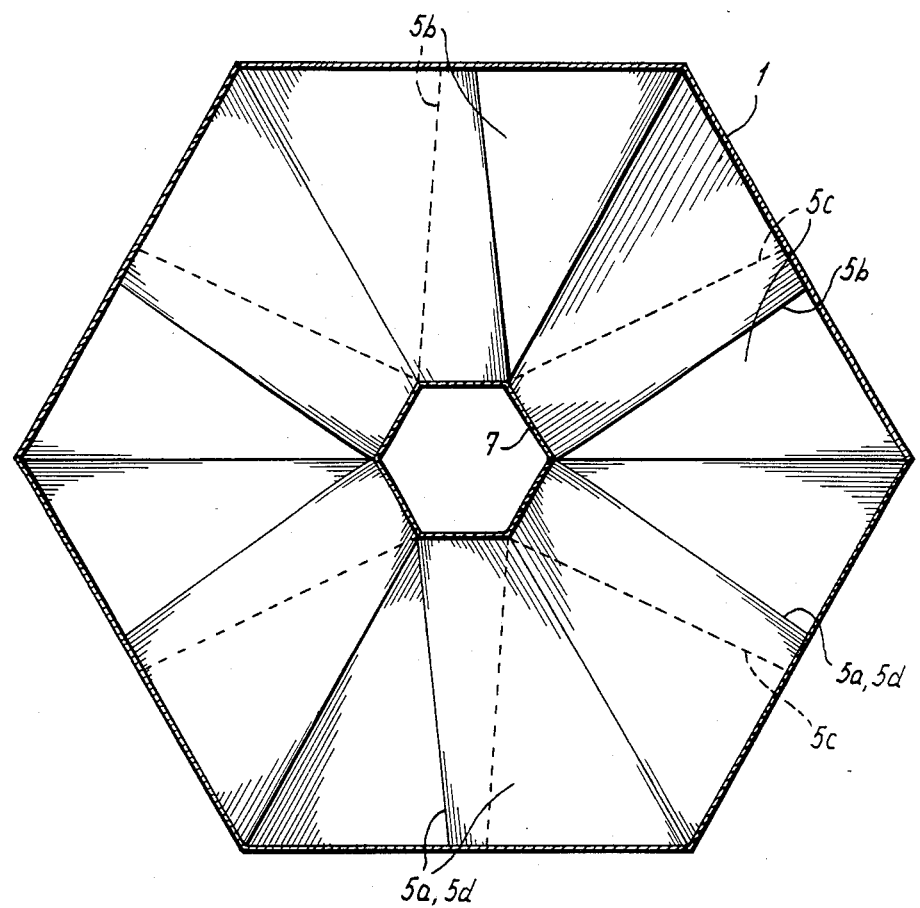
FIG. 3 shows a plan view of the collecting system according to FIG. 2.

The anaerobic purification equipment shown in FIGS. 1-3 comprises a tall container 1 into the bottom end of which there discharges an inlet 2 for influent. Near the upper rim of the container effluent gutters 3 are fitted which are connected to a drain pipe 4. Within the container two collecting systems 5 and 6 for gas and buoyant sludge are fitted, each consisting of hoods fitted at four levels 5a, b, c, d and 6a, b, c, d respectively which to some extent slope in the direction of a central rising pipe 7.

During operation fermentation takes place particularly in the bottom section of the reactor under anaerobic conditions as a result of contact between sludge grains and substances soluble in water such as fatty acids, methane being formed. A portion of the sludge grains absorb so much methane that they become lighter than the ambient fluid. In order to achieve a quiet, turbulence-free flow in the uppermost part of the reactor and to ensure that virtually no sludge is carried off with the effluent, there is fitted at a level, which is at a substantial distance below the overflow gutters 3, a collecting system which guides the gas and the buoyant sludge into the rising pipe 7. In the pipe 7 the gas and sludge collected by the system 5 end up in a constricted section of pipe 7' which is fitted inside the unconstricted section of pipe 7. The collecting system 6 guides the collected gas and possibly some foam into the unconstricted section of pipe 7. Both the sections 7 and 7' discharge into a separation chamber 8 where liquid and gas are separated from each other. Liquid gathers at the bottom of the separation chamber 8 and flows via a downpipe 9 to the bottom section of the reactor. A pipe 12 extends between the separation chamber 8 and a defoamer 11 in which sludge and liquid are separated from gas. Liquid with sludge is guided to the downpipe 9 through pipe 10.

As a result of the fact that the gas has been removed from it, the liquid column in the pipe 9 is heavier than the ambient liquid in the reactor 1. This means that a fairly powerful downward flow is produced in the downpipe 9 which stirs up the relatively heavy sludge at the bottom of the reactor. In addition, separated sludge is returned to the bottom section of the reactor. In a simple way the effect is therefore achieved that tranquility prevails at the top of the reactor and heavy sludge and influent at the bottom of the reactor are thoroughly mixed by turbulence.

The construction of the collecting systems 5 and 6 is such that accelerations of the flow by constrictions of the cross-section are to a large extent limited. FIGS. 2 and 3 show that in each of the layers 5a, 5b, 5c and 5d two gas hoods are fitted, the two gas hoods in each level occupying less than half the cross-sectional area. The hoods of successive layer overlap each other and the hoods of the four layers together cover the whole cross-sectional area. The cross-sectional area of the reactor occupied by the hoods of a single layer should not be more than 55% of the total cross-section and preferably less (for example, less than 50%). The outlines of the various hoods are indicated in FIG. 3 by the reference figure of the layer concerned.

It is possible to combine a number of embodiments according to FIGS. 1, 2 and 3 into a big reactor container.

Figure 4:
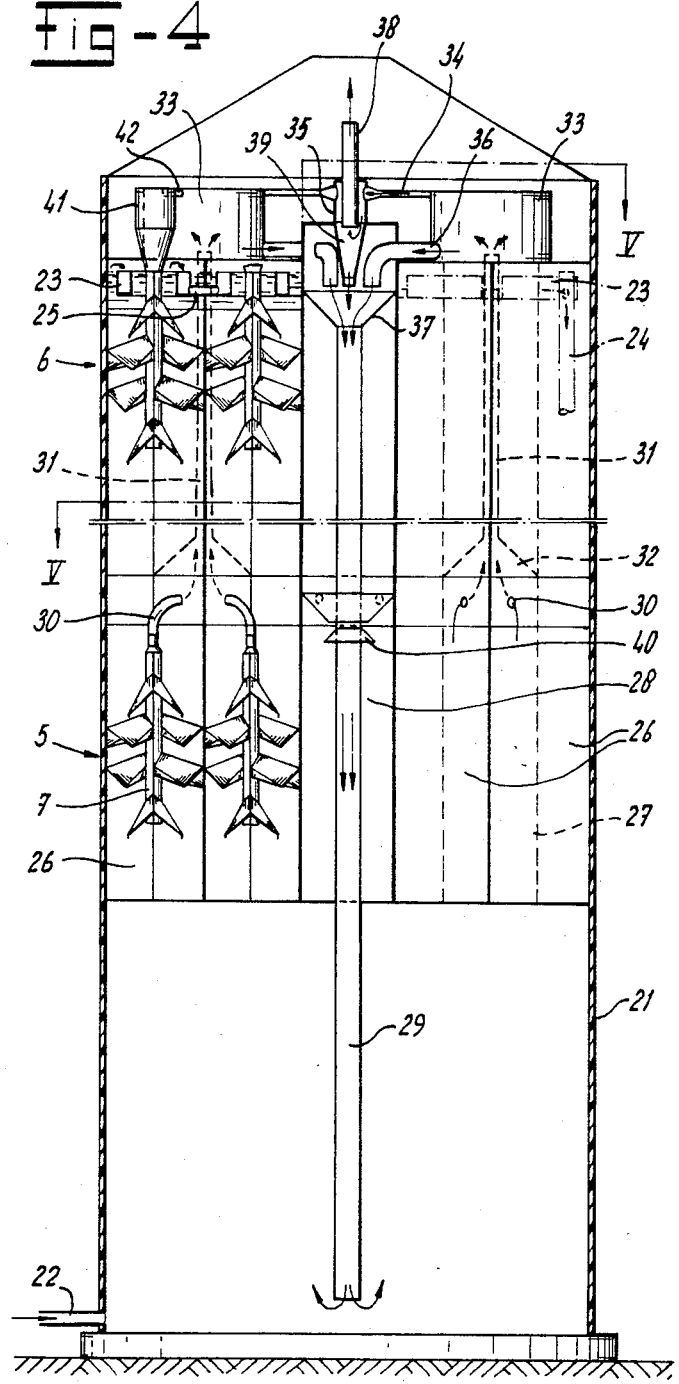
FIG. 4 shows a vertical section of a second embodiment.
Figure 5:
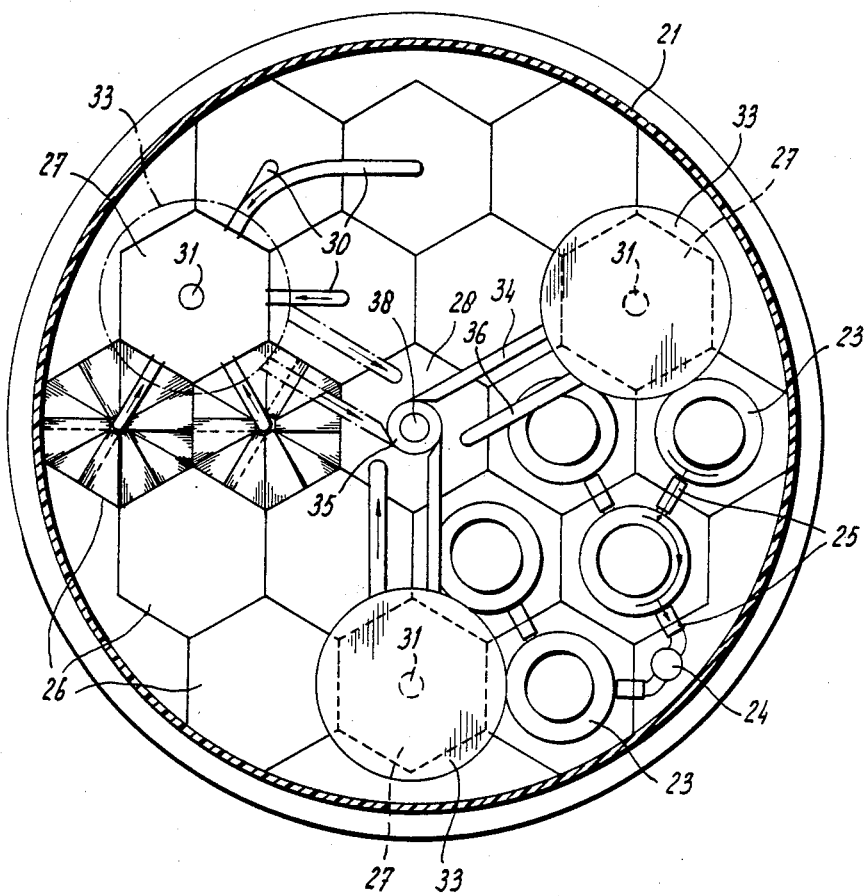
FIG. 5 shows a horizontal section along the line V—V in FIG. 4.

FIGS. 4 and 5 show a second embodiment in which the reactor has a much larger cross-sectional area and is filled with a large number of hexagonal pipes. The reactor container is indicated by 21, the influent inlet by 22, annular effluent gutters by 23 and the main drain for effluent by 24. The gutters 23 and the main drain 24 are connected to each other by pipes 25.

Within the container there are arranged approximately fifteen hexagonal reactor pipes 26, three combined hexagonal rising pipes 27, and a central hexagonal pipe 28. In this last-named is mounted a downpipe 29 which, in contrast to the hexagonal pipes 26, 27 and 28, extends almost to the bottom of the reactor 21. The pipes 26, 27 and 28 are arranged in a honeycomb pattern.

In each of the reactor pipes 26 there are gas-collecting systems 5, 6 at two levels. These have the same construction and position in relation to each other as described in connection with FIGS. 1, 2 and 3. The gas-collecting systems 5 at the relatively low level guide the collected gas and buoyant sludge to a rising pipe 7 which narrows connection pipe 30. One or more connection pipes 30 are connected to a combined rising pipe 27. In the combined rising pipe 27 there is accommodated a pipe 31 of considerably smaller cross-section which is joined to the pipe 27 by an adaptor 32. Each of the three pipes 31 discharges at its upper rim into a separation chamber 33, the three chambers 33 being connected via connecting pipes 34 to a defoamer 35 and connected via connecting pipes 36 to a funnel 37 into which the central downpipe 29 debouches. The defoamer has a gas outlet 38 and a liquid drain 39.

Also pipe 28 has a gas collecting system 40 collecting gas bubbles and guiding gas to a rising pipe. Pipe 28 is closed above system 40.

The gas-collecting systems 6 are located in each of the reactor pipes 26 immediately below the annular overflow gutters 24 for effluent. These systems collect the residual gas and foam and guide them to a rising pipe 7 which debouches into a gas-liquid separator 41. The fluid separated in the latter is conveyed via pipes 42 and a combined chamber 33 to the downpipe 29. The gas obtained is combined with the gas from the defoamer 35.

In this reactor, which is more complicated compared with FIGS. 1, 2 and 3, the effect is also achieved that gas and buoyant sludge are removed from the reactor pipes 26 at a relatively low level via the collecting systems 5 and the pipes 27, 32, 21 so that in the uppermost part of the reactor pipes 26 tranquility prevails and effluent containing virtually no sludge can flow into the gutters 23. In addition, the heavy sludge at the bottom of the reactor will be stirred up by the relatively heavy liquid which flows downwards from the combined funnel 37 through the downpipe 29. The mixing of influent and sludge is considerably improved as a result. The excess and even dangerous kinetic potential energy of the gas in the uppermost regions of the reactor is used by bring about the necessary mixing and fluidisation in the bottom reagions.

Within the scope of the invention various modifications are possible. The embodiments drawn and described are only examples. All the embodiments have in common that a significant portion of the gas evolved during the fermentation and the buoyant sludge are collected before they can reach the uppermost section of the reactor and that the liquid propelled up in this process by the gas-lifting action is separated from gas and the potential energy of the relatively heavy liquid column is used via a recirculating flow to obtain the stirring necessary for a thorough mixing and fluidisation at the bottom of the reactor. Power present at the top of the reactor is taken to the bottom. The load capacity of the reactor is considerably increased as a result of the tranquility at the top and the turbulence at the bottom. The special construction of the overlapping gas hoods off-set in layers results in a good collection of gas and buoyant sludge without noticeable accelerations of the liquid.

What is claimed is:

1. Anaerobic purification apparatus for treatment of waste water by fermentation in contact with sludge to produce gas and purified water, comprising:

apparatus comprising at least one reactor tube for fermentation, means for introducing influent into said at least one reactor tube, means for collecting and discharging purified water near the uppermost end of the at least one reactor tube, a first collecting system for removing gas from water being positioned at a small distance under the level of said means for collecting and discharging purified water, a second collecting system for collecting a gas-water-sludge mixture and passing water, said second collecting system being positioned at a considerable distance vertically under the level of said means for collecting and discharging purified water, both collecting systems extending substantially across the entire cross-section of the reactor tube, at least one rising pipe for raising the gas-water-sludge mixture by gas lifting action, said rising pipe being in connection with said second collecting system, a separation device for separating gas and water in connection with said rising pipe at the upper end of said pipe, and at least one downpipe extending from said separation device to the lowermost part of the reactor tube for returning the separated water and sludge.

2. Anaerobic purification apparatus according to claim 1, wherein at least said second collecting system includes plurality of hoods arranged in layers, the hoods in each layer having a certain offset in relation to the hoods of a subsequent layer and the cross-section occupied by the hoods in one layer being at most 55% of the total cross-sectional area of the reactor tube.

3. Anaerobic purification apparatus according to claim 1, additionally comprising a defoamer for separating gas and foam, having an inlet connected to the separation device, and an outlet for separated liquid connected to said downpipe.

4. Anaerobic purification apparatus according to claim 1, wherein said first collecting system is also connected to said separation device.

5. Anaerobic purification apparatus for treatment of waste water by fermentation in contact with sludge to produce gas and purified water, comprising:

a reactor vessel, a plurality of reactor tubes for fermentation, said tubes being arranged in said vessel, means for introducing influent into said vessel, means for collecting and discharging purified water near the uppermost end of the reactor tubes in the vessel, a first collecting system for collecting and removing gas from water and passing the water, said first collecting system being positioned at a small distance under the level of said means for collecting and discharging purified water, a second collecting system for collecting a gas-water-sludge mixture and passing water in each reactor tube, said second collecting system being positioned at a considerable distance vertically underneath the level of said means for collecting and discharging purified water, each said collecting system extending substantially across the entire cross-section of a reactor tube, at least one rising pipe for raising the gas-water-sludge mixture by gas lifting action, said at least one rising pipe being connected with said second collecting systems, at least one separation device for separating gas and water, said at least one separation device being connected with the uppermost end of said at least one rising pipe, and at least one downpipe extending from said at least one separation device to the lowermost part of the reactor vessel for returning separated water and sludge.

6. Anaerobic purification equipment according to claim 5, wherein at least said second collecting system includes a plurality of hoods arranged in layers, the hoods in each layer having a certain offset in relation to the hoods of a subsequent layer and the cross-section occupied by the hoods in one layer being at most 55% of the total cross-sectional area of the reactor tubes.

7. Anerobic purification equipment according to claim 5, additionally comprising a defoamer for separating gas and foam, having an inlet connected to the at least one separation device, and an outlet for separated liquid connected to said at least one downpipe.

8. Anaerobic purification apparatus according to claim 5, wherein said first collecting system is also connected to said at least one separation device.

9. Anaerobic purification apparatus according to claim 5, additionally comprising a plurality of combined rising pipes alternating with a plurality of pipes for conveying purified water to said means for collecting and discharging.

10. Anaerobic purification apparatus according to claim 9, wherein said combined rising pipes and said pipes for conveying purified water are of hexagonal cross-section and join each other in a honeycomb pattern.

* * * * *